UNITED STATES PATENT OFFICE.

EDWARD A. PATERSON, OF PORT ARTHUR, ONTARIO, CANADA.

COMPOSITION OF MATTER FOR USE IN MAKING ROADS AND PROCESS OF MAKING SAID COMPOSITION.

987,597. Specification of Letters Patent. Patented Mar. 21, 1911.

No Drawing. Application filed June 20, 1910. Serial No. 567,959.

*To all whom it may concern:*

Be it known that I, EDWARD ALFRED PATERSON, a subject of the King of Great Britain, and at present residing at Port Arthur, in the Province of Ontario, Canada, have invented certain new and useful Improvements in Compositions of Matter for Use in Making Roads and in Processes of Making Said Composition, of which the following is a specification.

According to this invention I provide a new composition of matter suitable for use in connection with other material, such as limerock, in the construction of roads, pavements, etc.

In carrying out my invention I dissolve a suitable quantity of quicklime in a hot solution of sugar, such as beet sugar, in such manner as to produce sucrate of lime. Preferably a 10% solution of sugar is employed with an excess of lime so that some of the lime is left undissolved. This solution is then diluted with preferably three times its volume of water and the resulting solution is mixed with a suitable quantity of a solution of an alkaline silicate, such as silicate of soda, at from 30 to 50 degrees Twaddell. Preferably the solution of sucrate of lime is mixed with an equal quantity of the silicate of soda solution. This mixture is in a suitable condition to be used or to be barreled and transported for use in connection with carbonate of lime or any limerock or a combination of limerock and phosphate of alumina rock to produce a matrix for binding the crushed rock or gravel ordinarily used in the construction of roads. When the solution of sucrate of lime and silicate of soda is mixed with limerock, or the like, and exposed to the air, the silicate of soda is decomposed by the carbonic acid of the atmosphere, or by any vegetable acids that may be present forming carbonate of soda and gelatinous silica which combines with the sucrate of lime forming the hard and durable silicate of lime, while the sugar and the carbonate of soda go to waste. In this way a matrix for the coarse broken stone or gravel ordinarily used in the construction of roads is produced which will not easily wash away and which is otherwise strong, durable and efficient.

In my application for Patent No. 603,689, filed Jan. 20, 1911, I have claimed a matrix for a road composed of lime rock, sucrate of lime and alkaline silicate in which crushed rock or gravel is embedded, and I have also claimed a method of forming such a matrix and such a road.

I claim:—

1. A substance for use in road-making, comprising essentially sucrate of lime and silicate of soda mixed in suitable proportions to form, when exposed to carbon dioxid, silicate of lime.

2. A substance for use in road-making, comprising in solution essentially sucrate of lime and an alkaline silicate mixed in suitable proportions to form, when exposed to carbon dioxid, silicate of lime on the surface of the road.

3. The process of producing a solution for use in making roads, consisting in dissolving lime in the absence of carbon dioxid in a hot solution of sugar to produce sucrate of lime, and then mixing a diluted solution of the sucrate of lime in suitable proportion with an alkaline silicate.

Dated at the city of Woodstock, in the county of Oxford in the Province of Ontario this seventeenth day of June A. D. 1910.

EDWARD A. PATERSON.

Signed in the presence of—
JOSEPHINE TWELL,
A. E. BALL.

---

Copies of this patent may be obtained for five cents each, by addressing the "Commissioner of Patents, Washington, D. C."